(12) United States Patent
Supalov et al.

(10) Patent No.: US 7,769,856 B2
(45) Date of Patent: Aug. 3, 2010

(54) AUTOMATIC TUNING OF COMMUNICATION PROTOCOL PERFORMANCE

(75) Inventors: Alexander V. Supalov, Erfstadt (DE); Sergey I. Sapronov, Sarov (RU); Artyom A. Syrov, Sarov (RU); Dmitry V. Ezhov, Sarov (RU); Vladimir D. Truschin, Sarov (RU)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 11/984,322

(22) Filed: Nov. 15, 2007

(65) Prior Publication Data

US 2009/0129277 A1     May 21, 2009

(51) Int. Cl.
    *G06F 15/173* (2006.01)
(52) U.S. Cl. .................. 709/224; 709/221; 370/232; 370/241; 370/252; 370/389; 703/22
(58) Field of Classification Search ................. 709/224, 709/221; 370/232, 241, 252, 352, 389; 703/22
    See application file for complete search history.

(56) References Cited

U.S. PATENT DOCUMENTS

| | | | |
|---|---|---|---|
| 2002/0080784 A1* | 6/2002 | Krumel | 370/389 |
| 2002/1018583 | 11/2002 | Vetter | |
| 2007/0058547 A1 | 3/2007 | Berstis | |
| 2008/0184214 A1* | 7/2008 | Archer et al. | 717/155 |
| 2008/0316926 A1* | 12/2008 | Zhao et al. | 370/232 |
| 2009/0132223 A1 | 5/2009 | Supalov | |

OTHER PUBLICATIONS

Office Action, issued Apr. 30, 2010, for U.S. Appl. No. 11/984,249.

* cited by examiner

*Primary Examiner*—Wing F Chan
*Assistant Examiner*—Ruolei Zong
(74) *Attorney, Agent, or Firm*—Pearl Cohen Zedek Latzer, LLP

(57) ABSTRACT

A method or device may optimize applications on a parallel computing system. Environment variables data may be used as well as a test kernel of an application to optimize communication protocol performance according to a set of pre-defined tuning rules. The tuning rules may specify the output parameters to be optimized, and may include a ranking or hierarchy of such output parameters. Optimization may be achieved through use of a tuning unit, which may execute the test kernel on the parallel computing system, and may monitor the output parameters for a series of input parameters. The input parameters may be varied over a range of values and combinations. Input parameters corresponding to optimized output parameters may be stored for future use. This information may be used to adjust the application's communication protocol performance "on the fly" by changing the input parameters for a given usage scenario.

13 Claims, 3 Drawing Sheets

AUTOMATIC TUNING OF COMMUNICATION PROTOCOL PERFORMANCE

BACKGROUND OF THE INVENTION

Parallel computing systems are generally made up of many nodes, each of which is capable of performing data computation independently of the other nodes. Applications written to exploit this parallelism distribute their workload across multiple nodes in distinct processes. In such situations, nodes generally need to communicate with other nodes to share data. To achieve this sharing of data, a communication protocol may be used.

MPI, or Message Passing Interface, is a type language-independent communication protocol used to program parallel computers. MPI is not sanctioned by any major standards body; nevertheless, it has become the defacto standard for communication among processes that model a parallel program running on a distributed memory system. Actual distributed memory supercomputers such as computer clusters often run these programs. MPI is a specification, not an implementation. MPI has Language Independent Specifications (LIS) for the function calls and language bindings. The implementation language for MPI is different in general from the language or languages it seeks to support at runtime. Most MPI implementations are done in a combination of C, C++ and assembly language, and target C, C++, and Fortran programmers. However, the implementation language and the end-user language are in principle always decoupled.

One challenge of using a communication protocol such as MPI is tuning certain parameters to optimize performance of the communication protocol for a given application. Testing and selecting these parameters manually often requires hours to weeks of tedious tuning work and must be repeated for each unique application to be run on a parallel computing system. Similarly, any change to the composition of the parallel computing system (e.g. number of nodes, change in communication fabric, etc.) requires a new set of parameters to be tuned for optimal performance. Automation of such a process may speed up the process considerably, saving many hours of tedious work.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may be best understood by reference to the following detailed description when read with the accompanied drawings in which:

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer, processor, or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, network equipment, stations of a radio system, wireless communication system, digital communication system, satellite communication system, and the like.

Stations, nodes and other devices intended to be included within the scope of the present invention include, by way of example only, local area network (LAN) stations and/or nodes, metropolitan area network (MAN) stations and/or nodes, personal computers, peripheral devices, wireless LAN stations, and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a personal area network (PAN), LAN, wide area network (WAN), or a global communication network, for example, the Internet.

Figure 1:
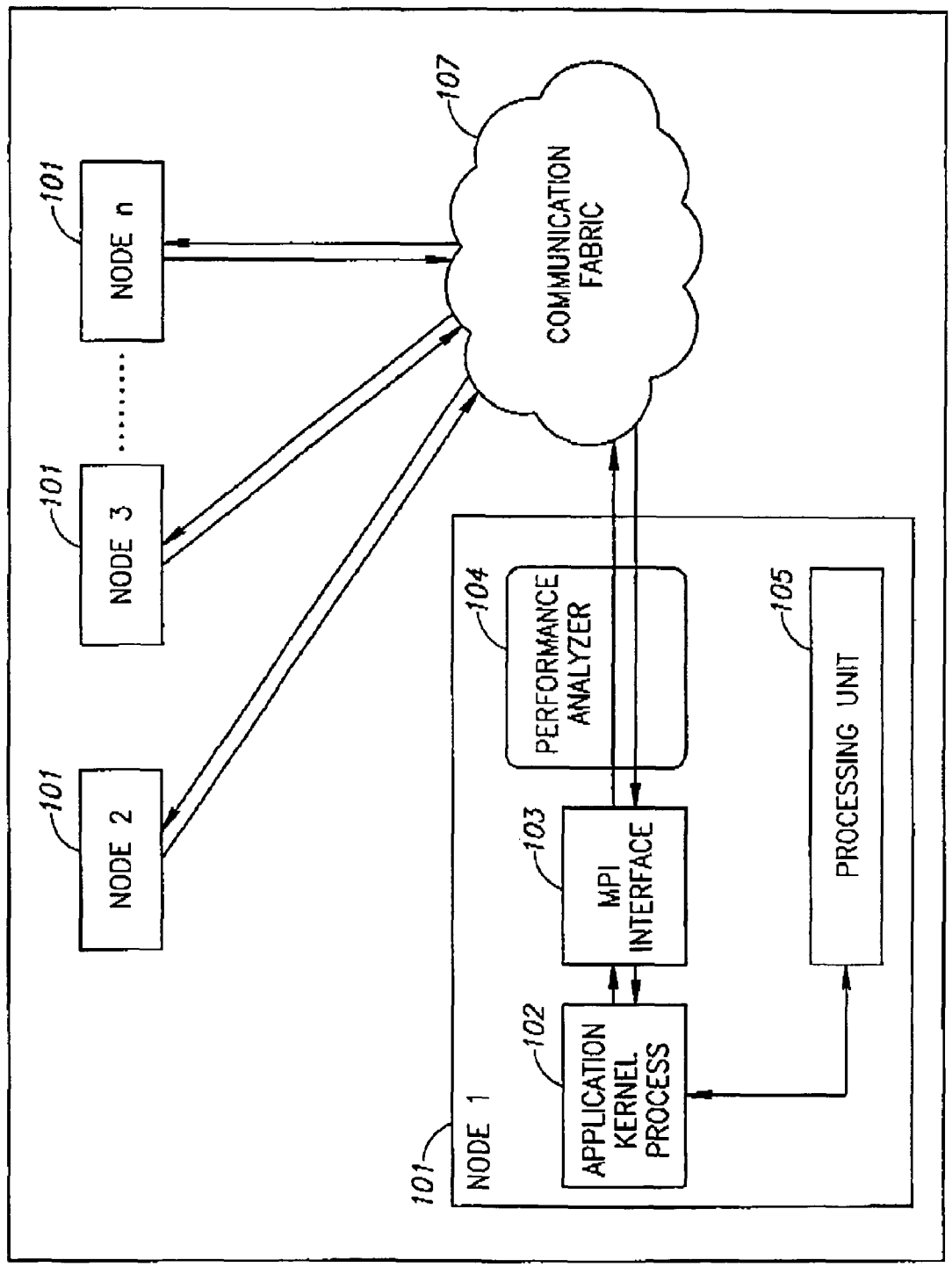
FIG. 1 is a block diagram showing a computing platform such as a parallel computer system that may be used with an embodiment of the present invention.

In FIG. 1, one embodiment of a parallel computing system 100 which can be used with the present invention is depicted. The system comprises a series of nodes 101 connected by communication fabric 107. Each node 101 may include a single processor or controller (e.g., CPU), or a group of processors or processor cores sharing a common volatile memory and/or non-volatile data store.

Each node may be tasked with executing an application kernel process 102, which is generally a single process within a larger application running on the entire parallel computing system 100. Each application kernel process 102 may perform a fraction of the total application workload. To achieve this, each node 101 may require data from other nodes, or may need to transmit its processed data output to other nodes.

To communicate with other processes, application kernel process 102 may employ MPI interface 103. Other interface or methods of communication may be used. Generally, MPI interface 103 is implemented as a library, such as the Intel® MPI Library, which employs specialized function calls to pass data between processes. The MPI library is then linked in at compile time into the application binary, although virtual machines and interpreters may be used as functional equivalents, as is well known in the computer arts. MPI interface 103 may also support a shared memory environment within and across nodes Performance analyzer 104 may capture and store information about the MPI or other interface or communication system performance, such as, for example, bandwidth and latency. Performance analyzer 104 may be implemented as an extension to MPI interface 103 as additional functions in an MPI library, or may employ a separate compiled program. Performance analyzer 104 may also be embedded in hardware, and may be capable of physically interfacing with parallel computing system 103.

To pass data between nodes 101, MPI interface 103 may send messages over communication fabric 104, which links nodes to each other and to common data stores (not shown). Communication fabric 107 may employ, for example, a hierarchical switched network design such as Ethernet, or a switched fabric topology such as InfiniBand® or Fibre Channel, or a combination of the two. Other communication fabrics may be used.

Figure 2:
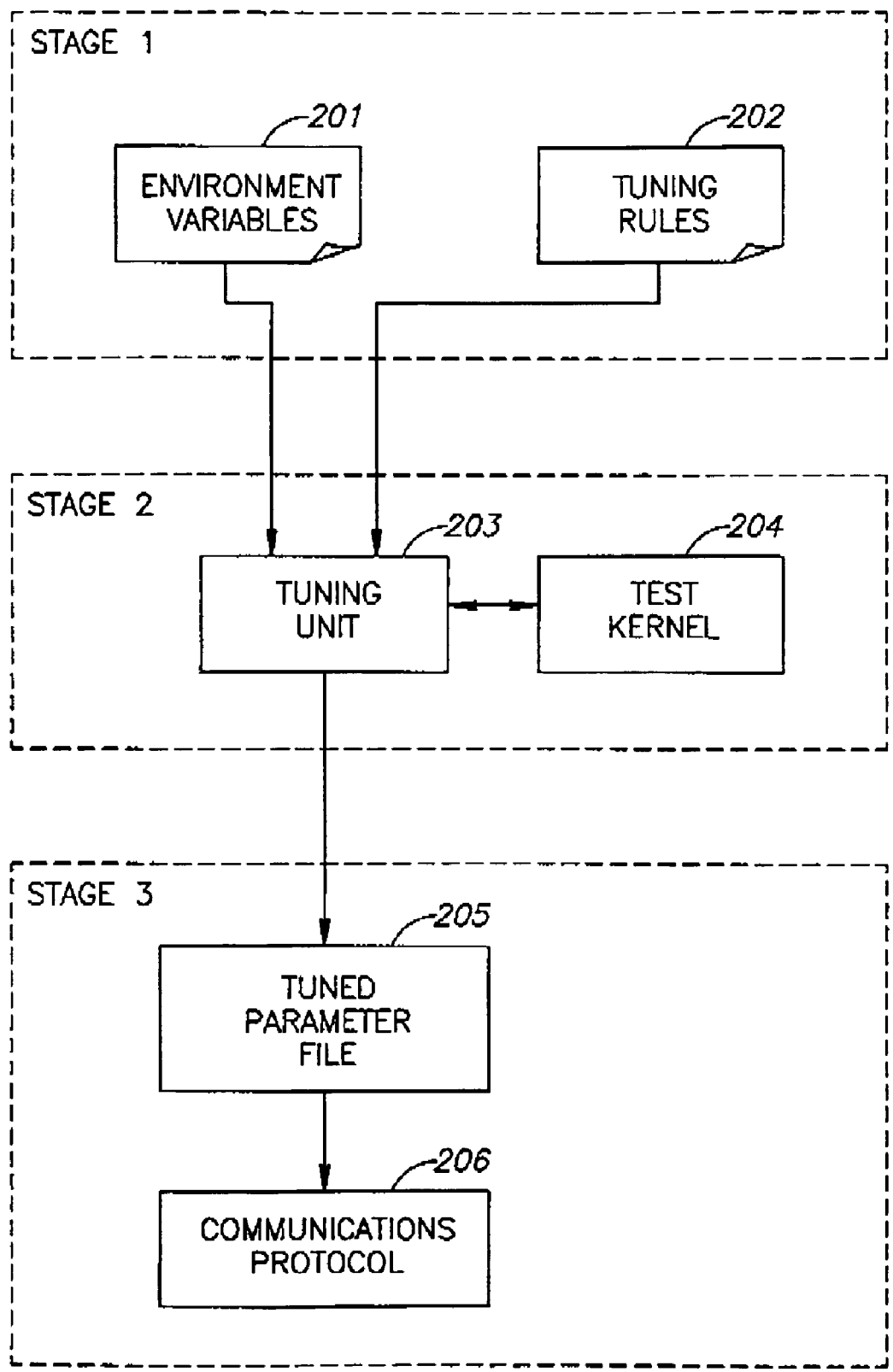
FIG. 2 is a block diagram and flow chart outlining the operations of tuning communication protocol performance according to one embodiment the present invention.

FIG. 2 outlines an overall process by which communications protocols such as MPI may be optimized, according to one embodiment of the invention. In stage 1, environment information 201 and tuning rules 202 may be collected. Environment information 201 may include, for example, computing platform data describing the computing environment on which embodiments of the invention operate. This may include data such as the number of cluster nodes, number of CPUs per node, available communication fabrics (Ethernet, InfiniBand, etc.), operating system information, and other platform information. Environment information 201 may be captured automatically using standard hardware and software detection techniques, or may be specified beforehand in a manually created file.

Tuning rules 202 may specify a series of variable output parameters to be optimized, preferably in order of priority. Such variables may influence, for example, bandwidth or latency of the communication fabric; other variables may be used. Power and bandwidth costs may also factor into the determination of what variables to optimize. In addition to a hierarchy of output parameters to be optimized, tuning rules 202 may also include heuristics, such as one in which specific processes (or threads) should not be spread across multiple nodes or processors. These heuristics are known as process placement heuristics (or process pinning heuristics in the case when a process is restricted to a particular node or CPU within that node). Other heuristics may involve limiting/maximizing CPU usage or disk access. One or more, or a series of, tuning rules 202 may for example be specified by a user in advance, based on the particular needs of the application to be optimized and the computing platform to be used. However, the invention, in one embodiment, may also employ a series of predefined profiles for tuning rules, from which a profile may be automatically selected based on environment information 201 and application information.

In stage 2, environment information 201 and tuning rules 202 may be passed to tuning unit 203. Tuning unit 203 may receive information acquired in stage 1 and may interface with test kernel 204. Test kernel 204 may be a relatively small program designed to simulate a larger application whose communication protocol usage is to be optimized on a specific computing platform. However, test kernel 204 may also be the application program itself, or alternatively a standard communication pattern (benchmark) used to test communication protocols.

Tuning unit 203 may select the input parameters which result in the optimized output parameters specified in tuning rules 202. A process by which these input parameters may be selected, according to one embodiment of the present invention, is disclosed herein with the description of FIG. 3.

In stage 3, the input parameters selected in stage 2 may be stored in tuned parameter file 205 for use with communication protocol 206. Alternatively, the input parameters selected in stage 2 may be passed directly to communication protocol 206 for use with an application program. The parameters in tuned parameter file 205 are generally used as environment variables or options that influence performance of the function calls implementing communication protocol 206. Alternatively, the parameters may be arguments for instructions sent to the computing platform hardware itself.

Figure 3:
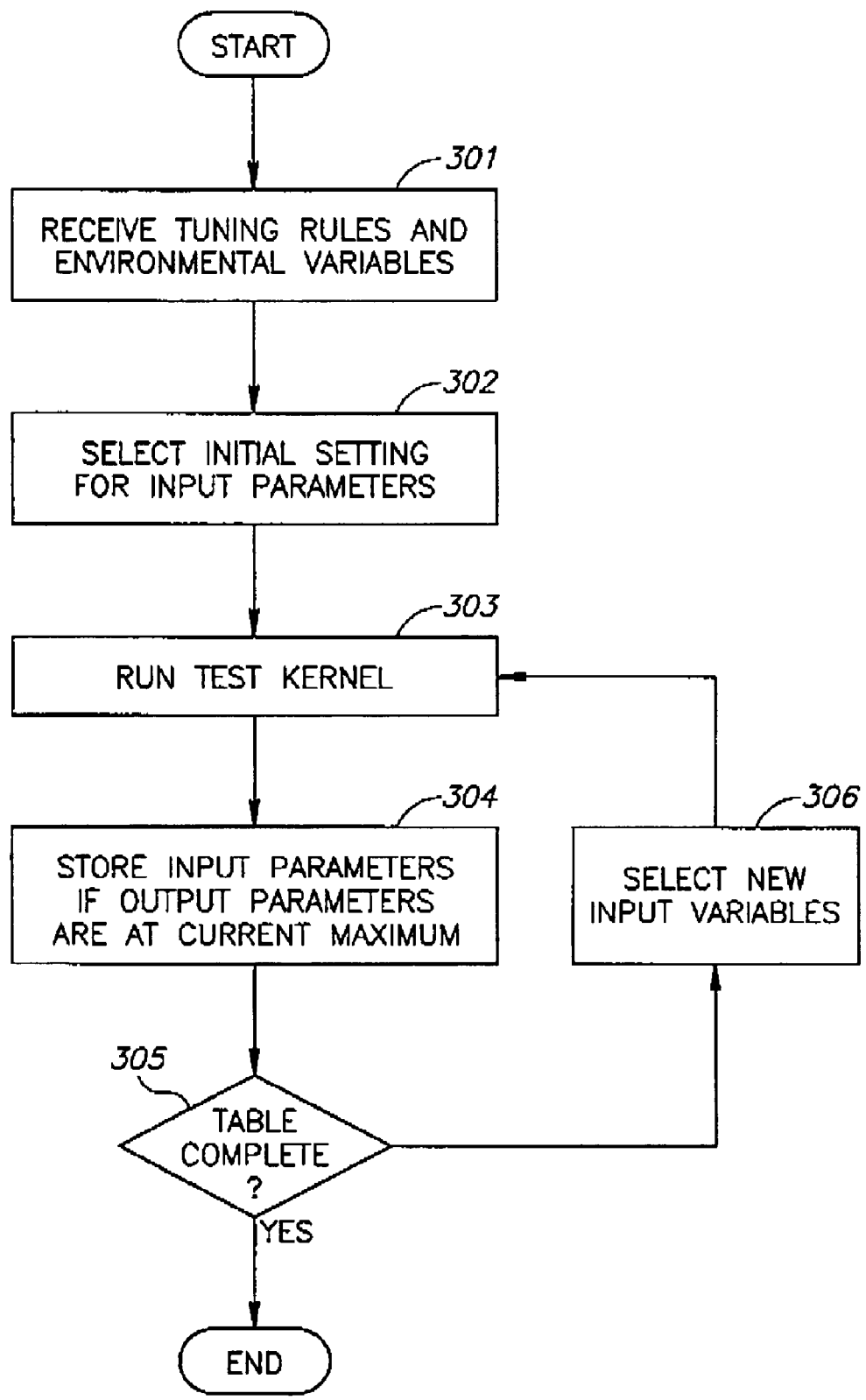
FIG. 3 is a flow chart outlining the operations of determining the optimal input parameters for the communications protocol according to one embodiment of the present invention.

Referring now to FIG. 3, the operations of tuning unit 203 is depicted, according to one embodiment of the invention. In operation 301, tuning unit 203 may receive tuning rules 202 and environment information 201. Tuning unit 203 may preferably be embodied as a computer program executed by processing unit 105 on a single or plurality of nodes 101. Alternatively, tuning unit 203 may be embodied in a dedicated hardware device which may either reside within node(s) 101, or may be a standalone device capable of interfacing with communication fabric 107.

In operation 302, tuning unit 203 may select an initial setting for input parameters. Input parameters may include for example numerical variables such as packet size, Boolean variables (e.g. having "on" or "off" values), or enumerable variables such as an indexed list of message transfer protocols (e.g. eager protocol, rendezvous protocol, etc.) or choice of communication fabrics (e.g. shared memory, InfiniBand, etc.). Other input parameters may include internal buffer alignment and size and message segmentation policy. In selecting initial input parameters, one strategy is to start with all Boolean variables set to "off", all enumerated variables set to the lowest index value, and all numerical values set to the lowest practical value. Other strategies, such as starting from the highest possible numerical value, or beginning with all Boolean variables set to "on", may be used.

In operation 303, tuning unit 203 may execute and analyze test kernel 204 and monitor the output. As noted herein, test kernel 204 may be for example an application program for use on the computing platform hardware (e.g. application kernel process 102), a simulated kernel to mimic the communication protocol usage of an application program, or a standard communication pattern (benchmark, e.g. Sendrecv, PingPong, etc.). Performance analyzer 104 may be used to measure such output parameters as bandwidth, latency, etc. and to transmit such data to tuning unit 203. Tuning unit 203 may reside on the network on a single node, such as a server, or may distribute its functions across multiple nodes.

Once output parameters have been measured and transmitted to tuning unit 203, operation 304 may be executed to determine whether the current output parameters are preferable to those currently stored in a list, table or other structure (for the same subset of enumerable and Boolean input variables). If so, then both the input parameters and the output parameters may be stored in the table. If current output variables are not preferable to the output variables, then the current output variables may be discarded.

In operation 305, tuning unit 203 may determine if the list or table of stored input/output parameters is complete. If all possible combinations of Boolean and enumerable input variables have been used with test kernel 204 for a sufficient range of numerical values, then the list or table is complete, and tuning unit 203 may cease operation.

If, however, the table is not complete, then tuning unit 203 may proceed to operation 306, and select new input variables.

Selection of input variables may comprise incrementing (or decreasing) one or more numerical variables by a suitable step size, toggling Boolean values, incrementing (or decreasing) enumerated index values, or a combination of these operations.

After selecting new input variables in operation 306, tuning unit 203 may run test kernel 204 with these new input variables and repeat operations 303-305, until the table is complete, as described herein.

Other operations or series of operations may be used.

As noted in FIG. 2, the table generated in FIG. 3 may then be used as tuned parameter file 205 in selecting optimal input parameters for communication protocol usage with test kernel 204 for any given situation stored in the file. The selection of optimal input parameters may be done while test kernel 204 (or its corresponding application program) is running on computing platform hardware (i.e. parallel computing system 100). This "on the fly" optimization may accommodate applications that run under a variety of communication protocol usage conditions. For example, distributed database software may usually perform simple table updates, but may also occasionally perform data normalization or aggregation tasks. Both cases may use the communication protocol in different ways. Embodiments of the current invention support such dynamic adjusting of communication protocol parameters according to application conditions.

Embodiments of the invention may include a processor-readable storage medium (e.g., a memory, a disk, a "disk-on-key", etc.) having stored thereon instructions that, if executed by a controller or processor, cause the processor to perform a methods described herein.

The present invention has been described with certain degree of particularity. Those versed in the art will readily appreciate that various modifications and alterations may be carried out without departing from the scope of the following claims:

The invention claimed is:

1. A method for altering communication protocol performance, the method comprising:
   collecting computing platform data and environment information related to a parallel processing system, the parallel processing system comprising a plurality of nodes communicating using a communication fabric;
   specifying a series of tuning rules;
   passing the computing platform data, the environment information and the tuning rules to a tuning unit;
   analyzing a simulation of said communication protocol performance by a test kernel using the tuning unit, wherein analyzing the simulation by the test kernel using the tuning unit comprises selecting initial settings for the input parameters, executing the test kernel on a computing platform, and measuring output parameters; wherein said simulation is according to said environment information, said computing platform data and said tuning rules;
   generating a tuned parameter file from the analysis of the test kernel; and
   using the tuned parameter file to select input parameters for use with the communication protocol.

2. The method of claim 1, wherein analyzing a test kernel using the tuning unit further comprises:
   determining whether the tuning unit requires further analysis of the test kernel;
   selecting new input parameters if further analysis is required; and
   analyzing the test kernel using the new input parameters.

3. The method of claim 2, wherein determining whether the tuning unit requires further analysis comprises ensuring that all combinations of enumerable input parameters have been analyzed over a range of all numerical input parameters.

4. The method of claim 2, wherein selecting new input parameters comprises toggling Boolean variables, increasing the index of enumerable variables, and incrementing/decrementing numerical values by a step value.

5. The method of claim 1, wherein the communication protocol is Message Passing Interface.

6. The method of claim 1, wherein the tuning rules comprise an ordered list of output parameters to be optimized and a set of heuristics.

7. The method of claim 1, wherein the input and output parameters are stored in the tuned parameter file.

8. The method of claim 1, wherein the input parameters selected for use with the communication protocol are varied as the application program is running.

9. A method for executing an application on a parallel computing system, the method comprising:
   measuring parameters related to a performance of a communication protocol based on a simulation of said communication protocol performance by a test kernel wherein the simulation by the test kernel comprises selecting initial settings for input parameters, executing the test kernel on a computing platform, and measuring output parameters, wherein said simulation is according to environment information, computing platform data and tuning rules;
   executing an application kernel containing at least one application kernel process on a plurality of nodes in the parallel computing system;
   interfacing the application kernel process with a communication fabric interface which implements said communication protocol; and
   transferring data from one node executing an application kernel process to a second node executing an application kernel process using said communication protocol and according to said measured parameters,
   wherein parameters related to said communication protocol are dynamically adjusted according to at least one application condition and according to said measured parameters.

10. The method of claim 9, wherein the measured parameters include at least internal buffer alignment and size, message segmentation policy, message passing protocol, and choice of communication fabric.

11. The method of claim 9, wherein measuring parameters comprises analyzing said simulation and selecting a set of input parameters corresponding to a set of heuristics and an ordered list of output parameters.

12. A processor-readable storage medium having stored thereon instructions that, if executed by a processor, cause the processor to perform a method comprising:
   collecting computing platform data and environment information related to a parallel processing system, the parallel processing system comprising a plurality of nodes communicating using a communication fabric;
   specifying a series of tuning rules;
   passing the computing platform data the environment information and the tuning rules to a tuning unit;
   analyzing a simulation of said communication protocol performance by a test kernel using the tuning unit, wherein analyzing the simulation by the test kernel using the tuning unit comprises selecting initial settings for the input parameters, executing the test kernel on a computing platform, and measuring output parameters; wherein said simulation is according to said environment information, said computing platform data and said tuning rules;

generating a tuned parameter file from the analysis of the test kernel; and using the tuned parameter file to select input parameters for use with the communication protocol.

13. The processor-readable storage medium of claim 12, wherein the instructions further cause the processor to execute the operations of:

determining whether the tuning unit requires further analysis of the test kernel;

selecting new input parameters if further analysis is required; and analyzing the test kernel using the new input parameters.

* * * * *